(12) United States Patent
Ananthakrishnan et al.

(10) Patent No.: US 12,045,114 B2
(45) Date of Patent: *Jul. 23, 2024

(54) THROTTLING OF COMPONENTS USING PRIORITY ORDERING

(71) Applicant: Intel Corporation, Santa Clara, CA (US)

(72) Inventors: Avinash Ananthakrishnan, Portland, OR (US); Jeremy Shrall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/405,972

(22) Filed: Aug. 18, 2021

(65) Prior Publication Data

US 2022/0043504 A1 Feb. 10, 2022

Related U.S. Application Data

(63) Continuation of application No. 16/144,919, filed on Sep. 27, 2018, now Pat. No. 11,099,628.

(51) Int. Cl.
*G06F 1/00* (2006.01)
*G06F 1/28* (2006.01)
(Continued)

(52) U.S. Cl.
CPC .............. *G06F 1/3296* (2013.01); *G06F 1/28* (2013.01); *G06F 1/32* (2013.01); *G06F 1/3203* (2013.01); *G06F 1/3206* (2013.01); *G06F 1/3212* (2013.01); *G06F 1/3234* (2013.01); *G06F 1/324* (2013.01); *G06F 9/30101* (2013.01); *G06F 9/30* (2013.01)

(58) Field of Classification Search
CPC . G06F 1/3296; G06F 1/28; G06F 1/32; G06F 1/3203; G06F 1/3206; G06F 1/3212; G06F 1/3234; G06F 1/324; G06F 9/30101; G06F 9/30; Y02D 10/00
See application file for complete search history.

(56) References Cited

U.S. PATENT DOCUMENTS 9,104,873 B1 * 8/2015 Chen ...................... G06F 21/566
10,871,818 B1 * 12/2020 De La Cropte De Chanterac ......
G06F 1/325
(Continued)

FOREIGN PATENT DOCUMENTS

WO 2015183586 A1 12/2015

OTHER PUBLICATIONS

International Search Report & Written Opinion dated Oct. 23, 2019, for PCT Patent Application No. PCT/US2019/039067.
(Continued)

*Primary Examiner* — Xuxing Chen
(74) *Attorney, Agent, or Firm* — NICHOLSON DE VOS WEBSTER & ELLIOTT LLP

(57) ABSTRACT

An apparatus is provided, where the apparatus includes a plurality of components, wherein an individual component has a corresponding throttling priority of a plurality of throttling priorities. The apparatus further includes logic to selectively throttle one or more of the plurality of components. In an example, an order in which the one or more of the plurality of components are to be throttled may be based on the plurality of throttling priorities.

21 Claims, 11 Drawing Sheets

(51) Int. Cl.
*G06F 1/32* (2019.01)
*G06F 1/3203* (2019.01)
*G06F 1/3206* (2019.01)
*G06F 1/3212* (2019.01)
*G06F 1/3234* (2019.01)
*G06F 1/324* (2019.01)
*G06F 1/3296* (2019.01)
*G06F 9/30* (2018.01)

(56) References Cited

U.S. PATENT DOCUMENTS

| | | | |
|---|---|---|---|
| 2007/0180280 A1 | 8/2007 | Bolan et al. | |
| 2009/0013204 A1* | 1/2009 | Kobayashi | H04W 52/0258 713/340 |
| 2009/0070611 A1* | 3/2009 | Bower, III | G06F 1/329 713/320 |
| 2009/0125737 A1 | 5/2009 | Brey et al. | |
| 2009/0132842 A1 | 5/2009 | Brey et al. | |
| 2011/0225593 A1* | 9/2011 | Hamilton, II | G06F 9/5094 718/104 |
| 2013/0073882 A1 | 3/2013 | Inbaraj et al. | |
| 2013/0173803 A1 | 7/2013 | Pijewski et al. | |
| 2014/0351621 A1 | 11/2014 | Conroy et al. | |
| 2015/0006925 A1* | 1/2015 | Branover | G06F 1/206 713/320 |
| 2015/0089249 A1* | 3/2015 | Hannon | G06F 1/3287 713/300 |
| 2015/0119103 A1 | 4/2015 | Ngai et al. | |
| 2015/0347330 A1* | 12/2015 | Vaishampayan | G06F 13/102 710/60 |
| 2015/0348226 A1* | 12/2015 | Vaishampayan | G06F 1/206 345/503 |
| 2016/0066266 A1 | 3/2016 | Law et al. | |
| 2016/0294707 A1* | 10/2016 | Chen | H04L 67/12 |
| 2017/0085084 A1* | 3/2017 | Daly | G06F 1/3215 |
| 2018/0267585 A1* | 9/2018 | Allen-Ware | G06F 1/3296 |
| 2018/0335806 A1 | 11/2018 | Min et al. | |
| 2019/0041971 A1 | 2/2019 | Ananthakrishnan et al. | |
| 2019/0050261 A1* | 2/2019 | Schmisseur | H04L 43/0817 |

OTHER PUBLICATIONS

International Preliminary Report on Patentability dated Apr. 8, 2021 for PCT Patent Application No. PCT/US2019/039067.
Non-Final Office Action issued Dec. 24, 2020 for U.S. Appl. No. 16/144,919, 16 pages.
Notice of Allowance, U.S. Appl. No. 16/144,919, filed Apr. 2, 2021, 7 pages.

* cited by examiner

Fig. 2

| Pa | Pb | ... | PN |
|---|---|---|---|

Register 200

Fig. 3

| Bits | Field | Value |
|---|---|---|
| [0:3] | Pa for component 104a | 1 |
| [4:7] | Pb for component 104b | 3 |
| [8:11] | Pc for component 104c | 2 |
| [12:15] | Pd for component 104d | 0 |
| [16:19] | Pe for component 104e | 1 |
| ... | ... | ... |
| [28:31] | PN for component 104N | 0 |

| Component ID | Component | Priority | Throttle scaling coefficient |
|---|---|---|---|
| 0x5 | Component 104g | 4 | Tg |
| 0x1 | Component 104b | 3 | Tb |
| 0x4 | Component 104c | 2 | Tc |
| 0x3 | Component 104a | 1 | Ta |
| 0x2 | Component 104e | 1 | Te |

This dict has a mapping of component ID to components
component_id_Hash = { 1:'QCLK', 2:'CDCLK', 3:'IPU_PSCLK', 4:'IPU_ISCLK' ...} }  704

This dict has a mapping of priority to component ID  708
component_priority_list = { 1:3, 2:1, 3:4, ... }

This dict has a mapping of component IDs to their throttle scalars. Throttle scalars can be seen as scalars that,
when multiplied with the parameter Rt, will result in a frequency at which to run that component. The larger the throttle  712
scalar, the more sensitive that component is to small changes in the parameter Rt.

Throttle_Scalars = { 1:T1, 2:T2, 3:T3, 4:T4... } for_priority in (component_priority_list):
  if (Rt < Threshold[_priority]):
    # Get the component_ID we want to operate one       716
    _component_ID = component_id_Hash[_priority]

Calculate the component frequency to run at for a given parameter $R_t$   720
    DVFS_Frequency[_component_ID] = $R_t$ * Throttle_Scalar[_component_ID]

Fig. 7

THROTTLING OF COMPONENTS USING PRIORITY ORDERING

RELATED APPLICATIONS

This application is a continuation of U.S. patent application Ser. No. 16/144,919, entitled "THROTTLING OF COMPONENTS USING PRIORITY ORDERING" filed on Sep. 27, 2018, and claims priority to the Ser. No. 16/144,919 application. The entire contents of the Ser. No. 16/144,919 application is incorporated herein by reference.

BACKGROUND

Modern computing devices are becoming more powerful and also shrinking generation over generation. Thus, the devices are integrating more and more components, while shrinking in size. Available power and thermal budget for various components are also shrinking. To stay within the power delivery and thermal capabilities, often time Dynamic Voltage and Frequency Scaling (DVFS) may be employed, in which voltage and/or frequency are scaled to meet the power and/or thermal budget. In general, throttling a component involves reducing a frequency and/or a voltage of the component. Modern computing devices often support throttling, e.g., to stay within platform power and thermal budgets.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 illustrates a register comprising throttling priorities respectively associated with the components of the computing device of FIG. 1, according to some embodiments.

FIG. 3 illustrates example values of the throttling priorities of the register of FIG. 2, according to some embodiments.

FIG. 6 illustrates a table depicting throttling priorities and throttling scalars for components of a computing device, according to some embodiments.

FIG. 7 illustrates an algorithm (e.g., in the form of pseudocodes) to selectively throttle components of a computing device, based on throttling priorities, according to some embodiments.

DETAILED DESCRIPTION

Figure 1:
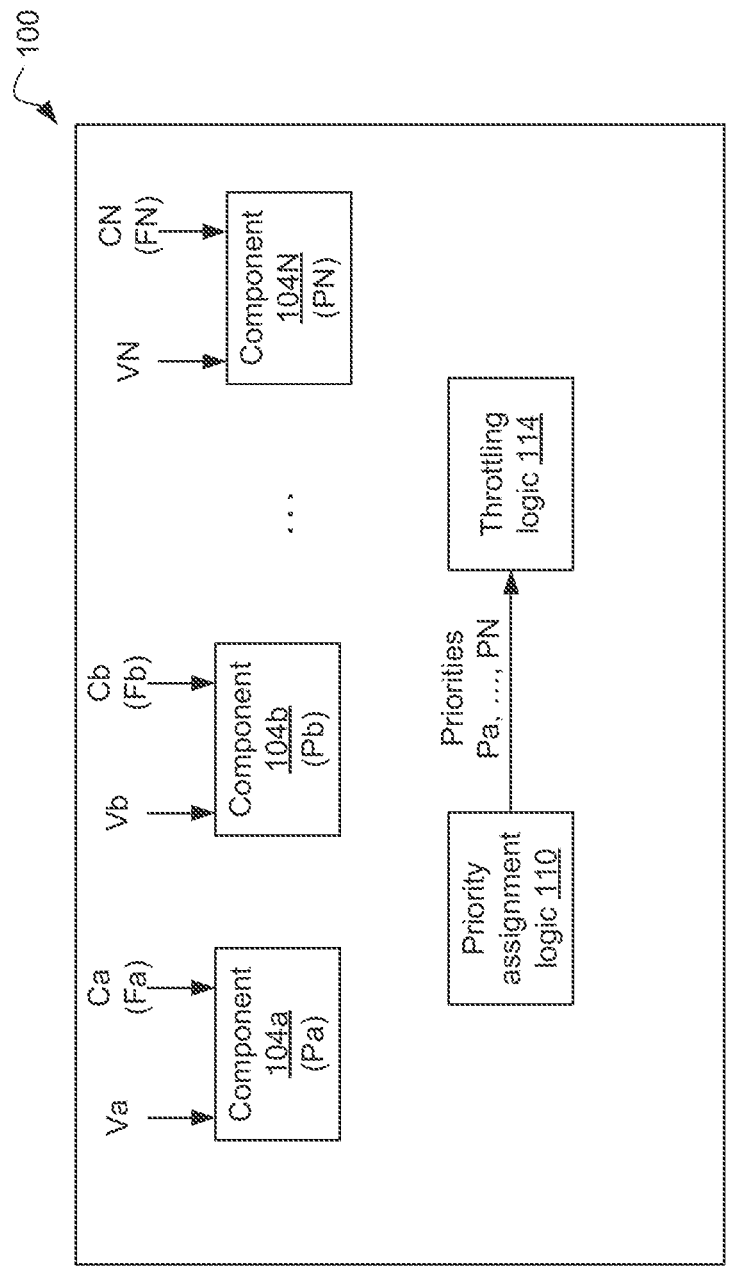
FIG. 1 schematically illustrates a computing device that implements throttling of components based on throttling priorities associated with the components, according to some embodiments.

The trend in modern microprocessors is to integrate more and more platform components and Intellectual Property (IP) blocks into a System on a Chip (SoC). For example, individual IP blocks (e.g., discussed herein later in this disclosure) may be housed in corresponding voltage and/or frequency domain. Also, modern client and device form factors are shrinking generation over generation. As a result, available power and thermal budget to the SoC is also shrinking. To stay within the power delivery and thermal capabilities of the platform, various IP blocks may support Dynamic Voltage and Frequency Scaling (DVFS). For example, voltage and/or frequency of an IP block may be dynamically scaled.

As a part of dynamic voltage and frequency scaling process, a component may be throttled (e.g., which involves reducing a voltage and/or frequency of the component), e.g., to meet a power budget, thermal budget, etc. Modern SoCs support throttling compute domains (e.g., domains that are associated with computing process, such as processing cores, integrated graphics processor core, hardware accelerator, etc., as discussed herein later in further details) to stay within platform power and thermal budgets. However, conventional SoCs do not support extending this throttling mechanism to various IP blocks, such as non-computing IP blocks (examples of which are discussed herein later) that are integrated into the SoC. Furthermore, conventional SoCs do not provide a mechanism to prioritize an order in which the non-compute IPs are to be throttled, e.g., to stay within platform power and thermal limits.

A computing device includes multiple voltage and/or frequency domains. Input voltage and/or frequency to individual domains may be controlled. For example, throttling a domain may involve reducing the input voltage and/or frequency to the domain. Throttling may be applied so that the device may adhere to a budget (e.g., a power budget, a thermal budget, a current budget, etc.).

In some embodiments, the domains (or components within the domains) are assigned corresponding throttling priorities. For example, components of a first domain are assigned a first priority, components of a second domain are assigned a second priority, and so on. The order in which the domains are throttled may be based on the priorities. For example, when a domain is to be throttled, the domain having the highest priority may be throttled first, followed by the domain having the second highest priority, and so on.

Thus, the domains are ordered in a descending order, based on the throttling priorities—the domains are throttled in the descending order. Un-throttling is done in a reverse order, e.g., in an ascending order of priority.

In some embodiments, to determine when to throttle the domains, a constraint headroom parameter may be determined, where the parameter is representative of constraint headroom available to the various domains. The constraint headroom may be a difference between a combined power budget available to the domains and a sum of power consumed by the domains (or a difference between a combined current budget available to the domains and a sum of current consumed by the domains, or the like). A domain may be throttled in response to the parameter becoming lower than a threshold value, and a domain may be un-throttled in response to the parameter becoming higher than a threshold value. The domains for throttling or un-throttling is selected based on the throttling priorities.

Thus, throttling and/or un-throttling the domains based on the throttling priorities ensures a systematic order in which the domains are to be throttled and/or un-throttled. This, for example, results in less critical or less important domains being throttled first, before throttling more critical domains. Other technical effects will be evident from the various embodiments and figures.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" or "some embodiments" means that a particular feature, structure, function, or characteristic described in connection with the embodiment is included in at least one embodiment of the invention. Thus, the appearances of the phrase "in an embodiment" or "in one embodiment" or "some embodiments" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

It is pointed out that those elements of the figures having the same reference numbers (or names) as the elements of any other figure can operate or function in any manner similar to that described, but are not limited to such.

FIG. 1 schematically illustrates a computing device 100 (also referred to as device 100) that implements throttling of components based on throttling priorities associated with the components, according to some embodiments. The device 100 comprises components 104a, ..., 104N, respectively being assigned throttling priorities (also referred to as priorities) Pa, ..., Pn. For example, the component 104a may be assigned priority Pa, the component 104b may be assigned priority Pb, and so on.

Elements referred to herein with a common reference label followed by a particular number or alphabet may be collectively referred to by the reference label alone. For example, components 104a, ..., 104N may be collectively and generally referred to as components 104 in plural, and component 104 in singular. Similarly, priorities Pa, ..., Pn may be collectively and generally referred to as priorities P in plural, and priority P in singular.

The components 104 may be any appropriate components of the device 100. The components 104 may include computing components and/or non-computing components. Examples of computing components include components that are involved in computing, processing, etc., such as one or more processing cores, a Central Processing Unit (CPU), a Graphic Processing Unit (GPU), a processor subsystem of an image processing unit (e.g., also referred to as IPU_PS), a hardware accelerator, etc. Examples of non-computing components include a memory, a display, an Input/Output subsystem of an image processing unit (also referred to as IPU_IS), an I/O subsystem, an interconnect fabric, etc. The components 104 may include an Intellectual Property (IP) block, e.g., a block that is developed and/or manufactured by a third-party manufacturer. In one example, the components 104 may include non-computing components, and may not include any computing components. The scope of this disclosure is not limited by the type or nature of the components 104.

In an example, a component 104 may be associated with a corresponding voltage and/or frequency domain. Thus, the component 104a may comprise circuitries that are included in a corresponding first voltage and/or frequency domain; the component 104b may comprise circuitries that are included in a corresponding second voltage and/or frequency domain; and so on.

For example, the component 104a of the first domain may receive voltage Va from a first Voltage Regulator (VR) and clock signal Ca from a first clock source; the component 104b of the second domain may receive voltage Vb from a second VR and clock signal Cb from a second clock source; and so on. The clock Ca has a frequency of Fa, clock Cb has a frequency of Fb, and so on.

In some embodiments, the components 104 may be independently and separately throttled. For example, as discussed herein in further details, based on the priorities Pa, ..., PN, individual ones of the components 104 may be throttled, e.g., by decreasing a corresponding voltage received by the component and/or by decreasing a frequency of a corresponding clock signal received by the component.

In some embodiments, the device 100 includes a priority assignment logic 110 (also referred to as logic 110). A logic, for the purposes of this disclosure, may refer to hardware elements, software elements, firmware elements, circuitries, and/or any combination thereof. The logic 110 may assign the priorities Pa, ..., PN.

FIG. 2 illustrates a register 200 comprising throttling priorities Pa, ..., PN respectively associated with components 104a, ..., 104N of the device 100 of FIG. 1, according to some embodiments. Although the register 200 may include any other information, merely the priorities Pa, ..., PN are illustrated in FIG. 2.

FIG. 3 illustrates example values of the priorities Pa, ..., PN of the register 200 of FIG. 2, according to some embodiments. Merely as an example, in FIG. 3 it is assumed that individual ones of the priorities Pa, ..., PN has 3 bits. The values assigned to the priorities Pa, ..., PN in FIG. 3 are merely examples. In the example of FIG. 3, the priorities Pa, Pb, Pc, Pd, Pe, ..., PN are respectively assigned values of 1, 3, 2, 0, 1, ..., 0.

Table 1 below illustrates example values of the priorities Pa, ..., PN of the register 200 of FIG. 2, for some example components 104 of the device 100. While FIG. 3 discusses the components 104 is generic terms, the Table 1 provides actual examples of the components 104. The components 104 in the Table 1 below are merely examples and do not limit the teaching of this disclosure.

TABLE 1

| Bits | Field | Value |
| --- | --- | --- |
| [0:3] | Priority of component "IPU_PS" | 1 |
| [4:7] | Priority of component "IPU_IS" | 3 |
| [8:11] | Priority of component "Memory" | 2 |
| [12:15] | Priority of component "Display" | 0 |
| [16:19] | Priority of component "IP block A" | 0 |
| ... | ... | ... |
| [28:21] | Priority of component "IP block N" | 0 |

Thus, Table 1 provides example priorities of different components, such as components, IPU_PS, IPU_IS (e.g., which are discussed with respect to FIG. 1), a memory, a display, and various IP blocks A, ..., N.

In an example, individual components 104 may be assigned a corresponding identification (ID). Table 2 illustrates individual components 104 of the Table 1 being assigned a respective ID.

TABLE 2

| Component | Component ID |
| --- | --- |
| Priority of component "Memory" | 0×1 |
| Priority of component "Display" | 0×2 |
| Priority of component "IPU_PS" | 0×3 |
| Priority of component "IPU_IS" | 0×4 |
| Priority of component "IP block A" | 0×5 |
| ... | ... |
| Priority of component "IP block N" | 0×N |

Now, combining Tables 1 and 2 provides the following Table 3:

TABLE 3

| Bits | Component ID | Field | Value |
|---|---|---|---|
| [0:3] | 0x3 | Priority of component "IPU_PS" | 1 |
| [4:7] | 0x4 | Priority of component "IPU_IS" | 3 |
| [8:11] | 0x1 | Priority of component "Memory" | 2 |
| [12:15] | 0x2 | Priority of component "Display" | 0 |
| [16:19] | 0x5 | Priority of component "IP block A" | 0 |
| . . . | . . . | . . . | . . . |
| [28:21] | 0xN | Priority of component "IP block N" | 0 |

Thus, Table 3 provides example priorities of different components, such as components, IPU_PS, IPU_IS (e.g., which are discussed with respect to FIG. 1), a memory, a display, and various IP blocks A, . . . , N, along with associated component IDs. Component IDs are discussed in further details with respect to FIG. 6 herein later.

Referring again to FIG. 1, in some embodiments, the device 100 comprises a throttling logic 114 (also referred to as logic 114). The logic 114 may selectively throttle one or more components 104.

In some embodiments, the throttling of the components 104 (e.g., by the logic 114) may be based on the priorities Pa, . . . , PN. For example, the higher a priority P of a component 104 is, the more likely the component 104 is to be throttled. For example, assume that due to the power, current, reliability, and/or thermal budget, a component has to be throttled. As illustrated in the example of FIG. 3, the priority Pb of the component 104b is the highest. Accordingly, the component 104b is throttled initially (e.g., a voltage Vb and/or frequency of the clock Cb is reduced). If the throttling of the component 104b is sufficient to meet the budget constraint, then no other components may be further throttled. However, if the throttling of the component 104b is not sufficient to meet the budget constraint, then component 104c (e.g., with priority Pc having a value of 2) may be throttled, followed by throttling of components 104a and/or 104e (e.g., if needed).

In some embodiments, if a component 104 has a priority of 0, then the component may not be throttled at all, or may be throttled if absolutely has to be (e.g., when other components with non-zero priorities have already been throttled and the budget constraint has not yet satisfied).

In some embodiments, if two or more components 104 has a same priority (e.g., components 104a and 104e having the same priority of 1), then any one or more of the two or more components may be throttled. The selection of the component from the two or more components may be based on any appropriate criterion (e.g., other than the priority), such as workload, type of component, etc.

However, in another example, more than one component may not have the same non-zero priority. For example, for components having non-zero priorities, each component may have a corresponding unique priority.

Figure 4A:
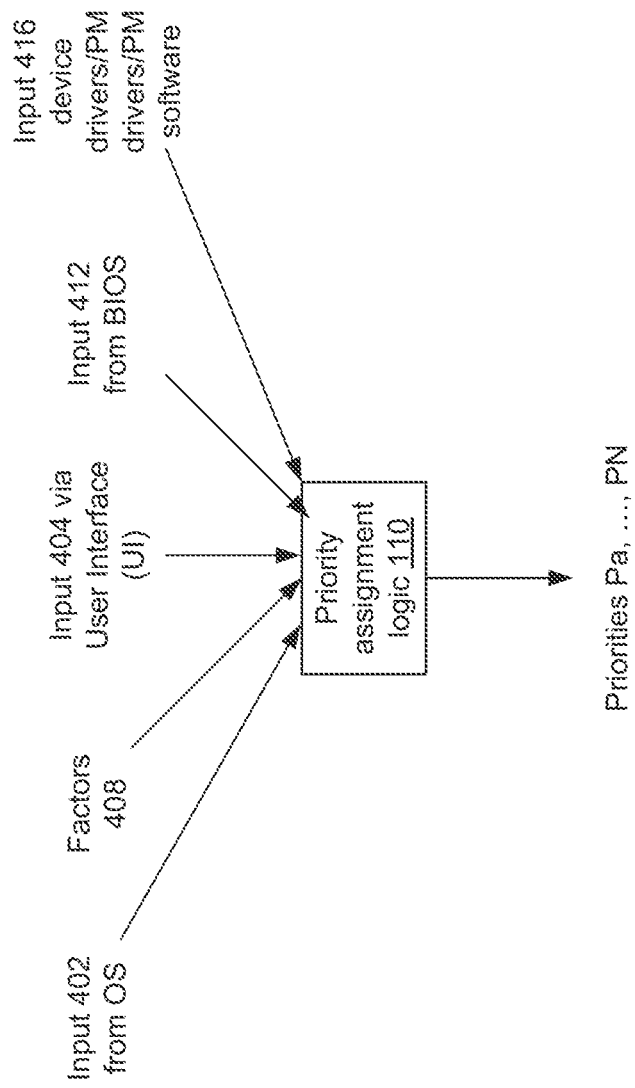
FIG. 4A illustrates dynamic generation of the throttling priorities, according to some embodiments.

FIG. 4A illustrates dynamic generation of the throttling priorities Pa, . . . , PN, according to some embodiments. For example, the logic 110 generates the priorities Pa, . . . , PN, based at least in part on input 402 received from the Operating System (OS), input 404 received via one or more User Interfaces (UIs) (e.g., from a user of the device 100), one or more factors 408, input 412 received from BIOS (Basic Input/Output System), input 416 received from various device drivers, Power Management (PM) drivers, PM software, and/or the like.

For example, the OS may assign and/or dynamically change the priorities Pa, . . . , PN, based on an operation of the OS, operation of the components 104, workload of the components 104, processes and/or threads running on the components 104, etc. In an example, a user of the device 100 may also configure the priorities Pa, . . . , PN, e.g., through the input 404.

Merely as an example, assume that the device 100 has a display screen of relatively high resolution, e.g., a 4K resolution (e.g., a horizontal screen display resolution of 4,000 pixels). Some temporary degradation of the display resolution may not be noticeable to a user, or may not result in an unsatisfied user. Accordingly, the input 402 and/or 404 may specify a high throttling priority for one or more components associated with rendering images on the display (e.g., such that these one or more components are throttled initially). For example, when these one or more components are throttled, the device 100 may operate the display screen at a reduced resolution of 2K, 1080p, and/or the like.

In an example, such a high throttling priority for these one or more components (e.g., components associated with rendering images on the high-resolution display) may be assigned when the device 100 is being used for, for example, word processing applications, browsing the internet, etc.

However, when the device 100 is being used for gaming or viewing a movie, a reduction in the display resolution may not be desired. Thus, in an example, in such situations, these one or more components (e.g., components associated with rendering images on the high-resolution display) may be assigned relatively low priority (e.g., such that these one or more components are throttled after throttling other high throttling-priority components).

Thus, in the above example, the throttling priority associated with the components for displaying on the display screen may be dynamically changed. The dynamic change in the throttling priority may be performed by the OS (e.g., via input 402), by the user using the UIs (e.g., via input 404), and/or based on the one or more factors 408. Dynamic changing of the throttling priorities, thus, involve changing the throttling priorities in real time, e.g., as and when new information is available. The above examples discuss dynamically changing the throttling priority associated with the components for displaying on the display screen.

Factors considered by the OS to determine the input 402 and/or factors 408 may include, for example, a criticality of a component 104, workload of the component, a P state or C state of the component (e.g., in accordance with the Advanced Configuration and Power Interface (ACPI) standard), bandwidth of the component, power consumed by the component, usage of the component, and/or any other appropriate factor(s) that may be used to determine throttling priority of a component.

In some embodiments, the logic 110 may also receive input 412 from the BIOS. For example, the BIOS may assign and/or dynamically change the priorities Pa, . . . , PN, based on pre-configured settings. In some embodiments, the logic 110 may also receive input 416 from one or more device drivers, power management drivers, power management software, etc.

Although FIG. 4A illustrates the logic 110 receiving input from the OS, BIOS, device drivers, via the UIs, etc., the logic 110 may receive input (e.g., for assigning the priorities Pa, . . . , PN) from any appropriate hardware and/or software sections of the device 100, e.g., a power management controller, a memory controller, a display controller, a processing core, etc.

Figure 4B:
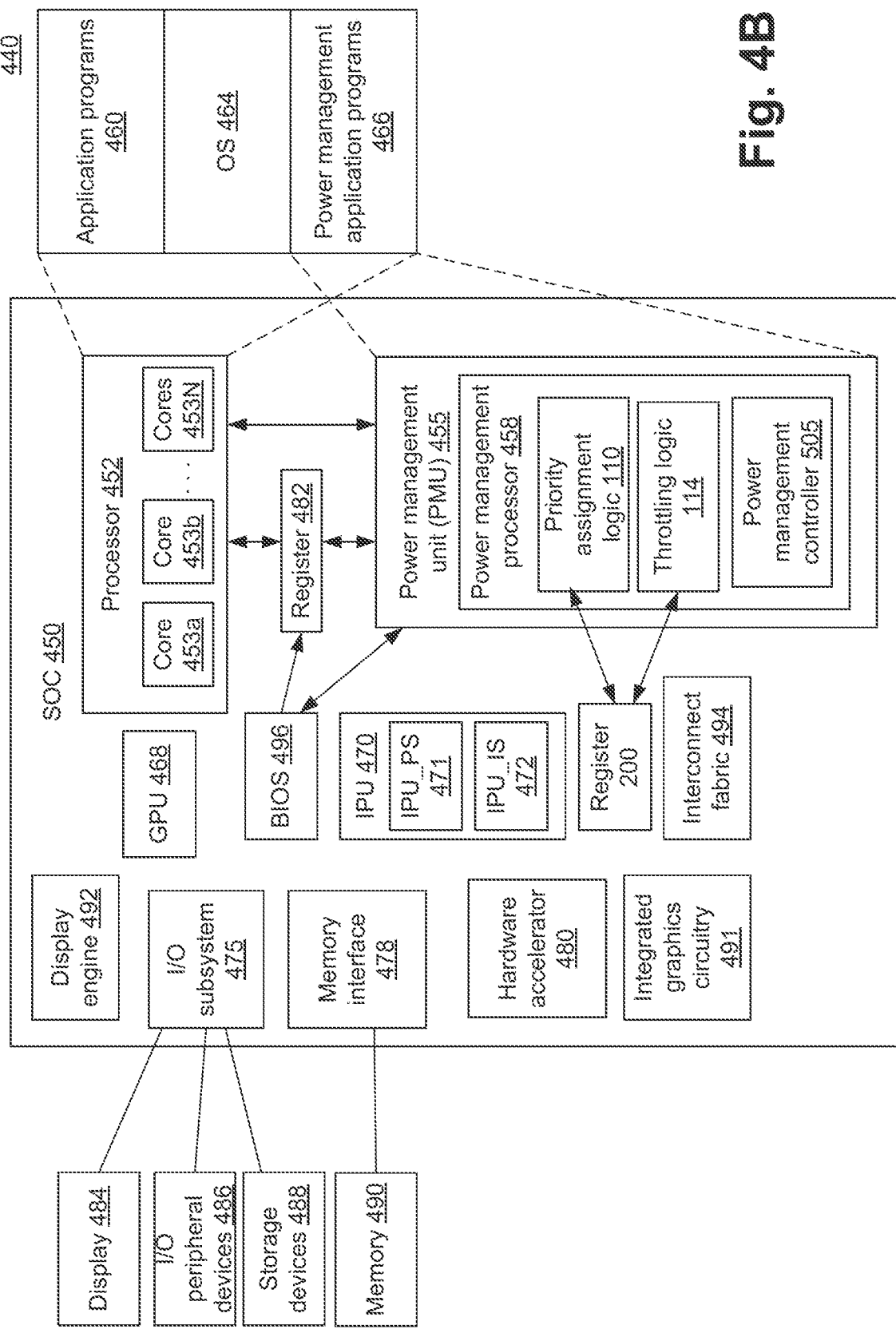
FIG. 4B illustrates an example system including a power management unit (PMU) that implements a priority assignment logic and a throttling logic, according to some embodiments.

FIG. 4B illustrates an example system 440 including a power management unit (PMU) 455 that implements the priority assignment logic 110 and the throttling logic 114, according to some embodiments. The system 400 comprises a SoC 450. In the example of FIG. 4B, the SoC 450 includes a processor 452 (e.g., a central processing unit (CPU)) comprising a plurality of processing cores 453a, 453b, . . . , 453N.

The system 440 comprises the PMU 455. In an example, the PMU 455 may include a dedicated power management processor 458, although in another example a section of the processor 452 (e.g., one or more cores 453) may be used to for the power management processor 458. In some embodiments, the power management processor 458 may be used to implement the priority assignment logic 110 and the throttling logic 114.

Various application programs 460, the OS 464, one or more power management application programs 466, etc. execute on the processor 452 and/or the power management processor 458. For example, the application programs 460 and the OS 464 may execute on the processor 452, and the one or more power management application programs 466 may execute on the power management processor 458.

As discussed with respect to FIG. 1, a logic, for the purposes of this disclosure, may refer to hardware elements, software elements, firmware elements, circuitries, and/or any combination thereof. Thus, for example, the priority assignment logic 110 and/or the throttling logic 114 may be implemented using the power management processor 458, power management application programs 466, and/or any appropriate hardware elements, software elements, firmware elements, circuitries, and/or any combination thereof. In some embodiments, the power management processor 458 may also include a power management controller 505 (e.g., discussed in further details with respect to FIG. 5).

The system 440 includes a software interface through which the OS 464 communicates with the PMU 455 (e.g., through which the OS 464 communicates with the priority assignment logic 110 of the PMU 455). For example, as discussed with respect to FIG. 4A, the OS 464 communicates the input 402 to the priority assignment logic 110 through such a software interface. In an example, an OS driver (not illustrated in FIG. 4B) of the OS 464 may be a part of the software interface between the OS 464 and the PMU 455. The OS driver may transmit the input 402 from the OS 464 to the PMU 455, e.g., directly or via the registers 484.

Merely as an example, an interface through which the OS 464 communicates with the PMU 455 may include one or more registers 482. For example, the OS 464 may write data in the registers 482 (e.g., write the input 402 in the registers 482), and the PMU 455 may fetch the written data from the registers 482. In another example, the OS 464 communicates with the PMU 455 directly (e.g., by bypassing the registers 482), which is illustrated as a direct line between the processor 450 and the PMU 455.

In some embodiments, the SOC 450 comprises the register 200 of FIG. 2. The priority assignment logic 110 may write the throttling priorities Pa, . . . , PN to the register 200, which may be accessed by the throttling logic 114.

In some embodiments, the SOC 450 comprises an IPU 470. As discussed with respect to FIG. 1, the IPU 470 includes IPU_PS 471, e.g., which may be a processor subsystem of the image processing unit (IPU) 470. The IPU 470 also includes IPU_IS 472, e.g., which may be the Input/Output subsystem of the IPU 470.

In some embodiments, the SOC 450 comprises a graphics processing unit (GPU) 468, an integrated graphics circuitry 491, a hardware accelerator 480 (e.g., which performs functions more efficiently than is possible in software running on the more general-purpose processor 452), a memory interface 478 (e.g., to interface with a memory 490), a display engine 492 (e.g., to render images on a display 484), BIOS 496, etc. The BIOS 496 may write data in the register 482 (e.g., write the input 412 in the register 482), and the PMU 455 may fetch the written data from the register 482. In another example, the BIOS 496 communicates with the PMU 455 directly (e.g., by bypassing the register 482), which is illustrated as a direct line between the BIOS 496 and the PMU 455.

The SOC 450 further comprises an I/O subsystem 475, e.g., for interfacing with one or more input/output devices, such as the display 484, one or more I/O peripheral devices 486, one or more storage devices 488, etc.

The components 104a, 104b, . . . , 104N of FIG. 1, on which the priority based throttling is applied, may comprise any appropriate component(s) of the system 400. For example, the system 400 includes computing components and/or non-computing components. Examples of computing components include components that are involved in computing, processing, etc., such as one or more processing cores 453, the processor 452, the GPU 468, the processor subsystem IPU)PS 471 of the image processing unit IPU 470, the hardware accelerator 480, etc. Examples of non-computing components include the memory 490, the display 484, the Input/Output subsystem IPU_IS 472 of the image processing unit IPU 470, the I/O subsystem 475, the interconnect fabric 494, etc. In one example, the components 104 (e.g., each of which has a corresponding throttling priority, and on which the priority based throttling is applied) may include non-computing components, and may not include any computing components. In one example, the components 104 may include non-computing components and/or computing components.

Figure 5:
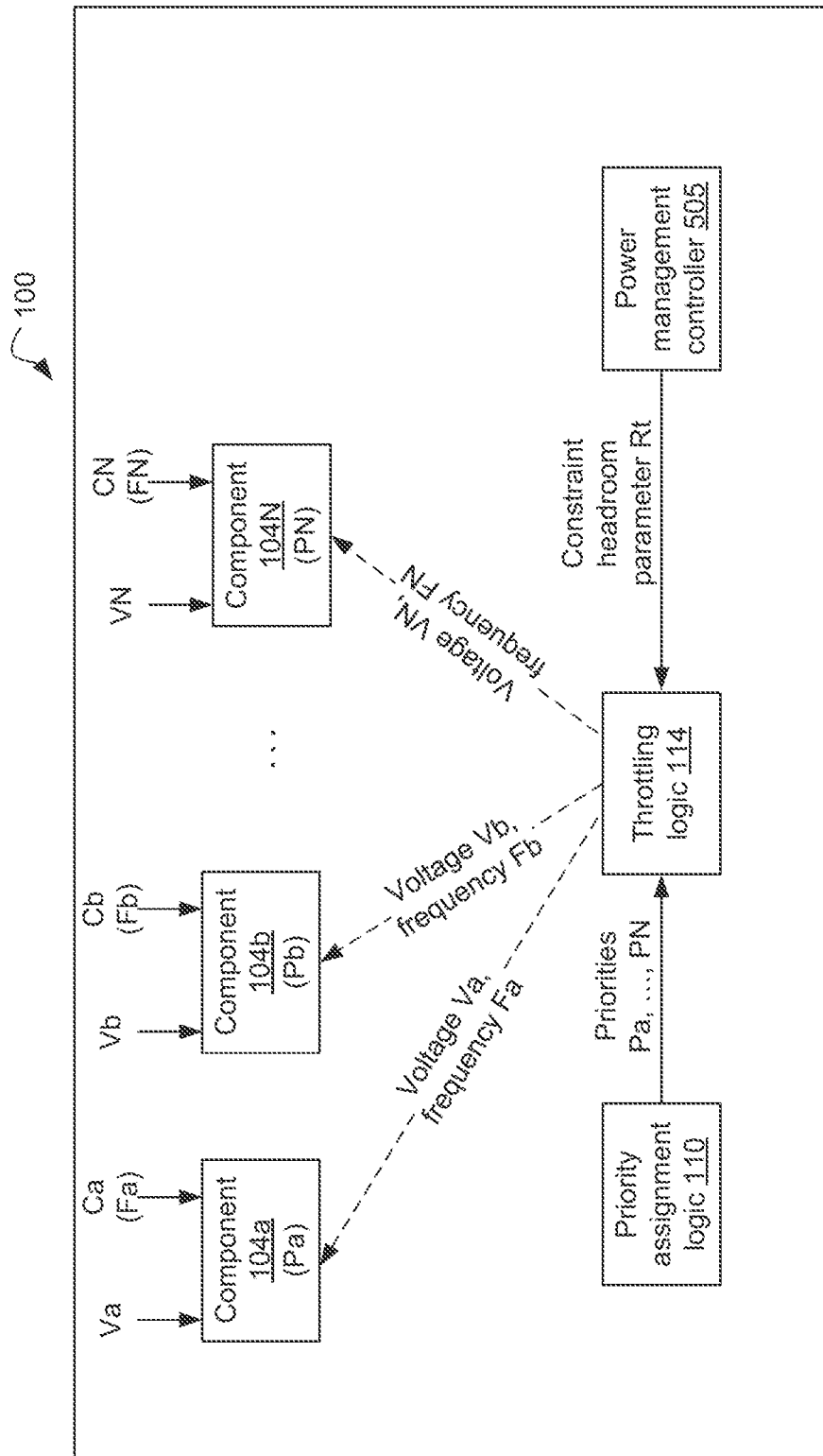
FIG. 5 schematically illustrates the computing device of FIG. 1 in further details, where the computing device includes a power management controller that determines a power headroom parameter, according to some embodiments.

FIG. 5 schematically illustrates the computing device 100 of FIG. 1 in further details, where the device 100 includes a power management controller 505 that dynamically determines a power headroom parameter Rt, e.g., to facilitate throttling various components 104, according to some embodiments.

In some embodiments, the power management controller 505 (also referred to as controller 505) determines a power headroom for the components 104. For example, assume that power and/or thermal constraints require that a sum of power consumption of the components 104 be less than, or equal to, a Power_limit. Thus, Power_limit may be a maximum permissible power or maximum budgeted power that may be consumed by the components 104. The Power_limit may change dynamically, e.g., based on power available to the device 100, a remaining battery power of the device 100, a type of power adapter supplying power to the device 100, temperature of the device 100, etc.

Also, assume that a sum of actual power consumption by all the components 104 is given by Consumed_power. Thus, Consumed_power changes with actual power consumption of the components 104. The Consumed_power may be controlled by controlling voltage supplied to the components 104, and/or frequency of clock signals supplied to the components 104. For example, throttling a voltage Va and/or a frequency Fa of the clock Ca of the component 104a may reduce the power consumed by the component 104a, thereby reducing the Consumed_power.

In an example, a power headroom refers to a difference between Power_limit and Consumed_power. Thus, the power headroom represents the power consumption of the components that may be increased, before the Power_Limit is reached. The power headroom has to be positive or zero, to ensure that the Consumed_power does not exceed the Power_limit.

In some embodiments, the power headroom is updated at periodic or aperiodic intervals, e.g., based on the Consumed_ power and Power_limit. For example, using an Exponentially Weighted Moving Average window (EWMA window), the Power_headroom Et at iteration t may be given by:

$$E_t = E_{t-1} * \alpha + (1-\alpha) * (\text{Power\_Limit} - \text{Consumed\_Power}) * \text{delta\_T}, \quad \text{Equation 1}$$

where $E_t$ is the power headroom at time t, $E_{t-1}$ is the power headroom at time (t−1) (e.g., power headroom from the previous time interval), Delta_T is the time interval of the update cycle, and a is an exponential decay. Thus, in equation 1, a difference between (i) a budget available to the plurality components (e.g., Power_Limit), and (ii) a sum of consumption by the plurality components (e.g., Consumed_Power) are computed, where the budget is a power budget. The factor α of equation 1 may be derived from the EWMA time window as follows:

$$\alpha = 1 - \text{delta\_T}/\text{Tau}, \quad \text{Equation 2}$$

where Tau is the EWMA time window. In an example, the controller 505 determines the Consumed_power and Power_limit, and updates the power headroom $E_t$ periodically.

In some embodiments, the controller 505 determines a power headroom parameter Rt (also referred to as a constraint headroom parameter Rt). The power headroom parameter Rt may be determined, based on the power headroom $E_t$. In some embodiments, the power headroom parameter Rt may be given by:

$$Rt = K_p * E_t + K_i * \Sigma_{i=0}^{t} E_t \quad \text{Equation 3.}$$

In equation 3, Rt is based on a proportional term of $E_t$ and an integral term of $E_t$. In equation 3, $K_p$ is a weighting factor for the proportional term of $E_t$, and K is a weighting factor for the integral term of $E_t$. Also, equation 1 already implements a derivative term of $E_t$. Thus, the combination of equations 1 and 3 implement proportional, integral and derivative (PID) components of the power headroom $E_t$. Although the combination of equations 1 and 3 provide a PID control to determine the power headroom parameter Rt, any other appropriate type of control may also be used (e.g., PI, P, or PD control, or another appropriate type of control).

Thus, the constraint headroom parameter Rt (also referred to as parameter Rt) is an indication of a constraint headroom (e.g., power headroom, thermal headroom, current headroom, etc.) available for the components 104 at time instant "t". In some embodiments, the parameter Rt may be dynamically updated by the controller 505 (e.g., updated continuously, at periodic or aperiodic intervals, etc.), and transmitted to the logic 114.

Thus, the logic 114 receives the priorities Pa, . . . , PN from the logic 110, and receives the parameter Rt from the controller 505. Based on the priorities Pa, . . . , PN and the parameter Rt, the logic 114 selectively throttles one or more of the components 104 (e.g., by controlling the voltage and/or operating frequency of the components).

Although equations 1, 2, and 3 are directed to a power budget (e.g., directed to a difference between a budget available to the plurality components, and a sum of consumption by the plurality components, wherein the budget is a power budget), any other appropriate budget may be used, such as a current budget, a thermal budget, a reliability budget, etc.

FIG. 6 illustrates a table 600 depicting the throttling priorities and throttling scalars for the components 104a, . . . , 104N of the device 100, according to some embodiments. For example, in table 600, components with non-zero priorities are listed (e.g., because components with zero priorities may not be usually throttled). Each component in the table 600 is identified by a Component ID (identification). The table 600 includes the components 104g, 104b, 104c, 104a, 104e, arranged in descending order of priority.

In some embodiments, the table 600 also include a throttling factor scaling coefficient T for individual components (e.g., throttling scaling coefficient Tg for component 104g, throttling scaling coefficient Tb for component 104b, and so on), which translates the parameter Rt to an amount of frequency that is to be throttled for the corresponding component. For example, if the component 104g is to be throttled, then the frequency Fg of the component 104g may be decreased by Rt*Tg.

In some embodiments, the logic 114 monitors the parameter Rt. If the parameter Rt falls below a first threshold, the logic 114 throttles a first entry of the table 600 (e.g., the one with the highest throttling priority). Thus, for the example table 600, if the parameter Rt falls below the first threshold, the logic 114 throttles the component 104g (e.g., reduces the voltage Vg and/or the frequency Fg, where the frequency Fg may be reduced by an amount equal to Rt*Tg).

If the parameter Rt falls further and is below a second threshold, the logic 114 throttles a second entry of the table 600 (e.g., the one with the second highest throttling priority). Thus, for the example table 600, if the parameter Rt further decreases below the second threshold, the logic 114 throttles the component 104b (e.g., reduces the voltage Vb and/or the frequency Fb, where the frequency Fb may be reduced by an amount equal to Rt*Tb).

This process continues iteratively, until the parameter Rt stabilizes. If Rt starts increasing, the components are un-throttled in the reverse order. For example, components with lower priorities get un-throttled before components with higher priorities. For example, the component 104b is un-throttled if the parameter Rt increases beyond the second threshold; and the component 104g is un-throttled if the parameter Rt increases beyond the first threshold.

FIG. 7 illustrates an algorithm 700 (e.g., in the form of pseudocodes) to selectively throttle components 104 of the device 100, based on a priority, according to some embodiments. The algorithm 700 comprises a section 704, in which various components 104 of the device 100 (e.g., components such as a QCLK, CDCLC, IPU_PSCLC, etc., which are mere examples of the names of the components) are assigned corresponding component IDs. Merely as an example, the component QCLK is assigned a component ID of 1, the component CDCLC is assigned a component ID of 2, the component IPU_PSCLC is assigned a component ID of 3, and so on.

In section 708 of the algorithm 700, individual components are assigned corresponding throttling priorities. For example, the component QCLK with the component ID of 1 is assigned a priority of 3, the component CDCLK with the component ID of 2 is assigned a priority of 1, the component IPU_PSCLK with the component ID of 2 is assigned a priority of 4, and so on.

In section 712 of the algorithm 700, individual components are assigned corresponding throttle scaling coefficients (referred to as Throttle Scalars in FIG. 7). For example, the component QCLK with the component ID of 1 is assigned a throttle scaling coefficient of T1, the component CDCLK with the component ID of 2 is assigned a throttle scaling coefficient of T2, the component IPU_PSCLK with the component ID of 3 is assigned a throttle scaling coefficient of T3, and so on.

In section 716 of the algorithm 700, a component is selected for throttling. For example, in section 716, it is determined if the parameter Rt is less than a threshold. If so, the component ID having a highest value of priority is selected for throttling. Merely as an example, as discussed with respect to section 708, the component ID 3 (e.g., corresponding to IPU_PSCLK) has a highest priority of 4. Accordingly, the component ID 3 (e.g., corresponding to IPU_PSCLK) may be selected for throttling.

In section 720 of the algorithm 700, the frequency reduction due to the throttling for the component ID 3 is determined, which may be Rt*T3, where T3 is the throttle scaling coefficient corresponding to component ID 3. Thus, the component IPU_PSCLK is throttled by a frequency of Rt*T3.

Figure 8A:
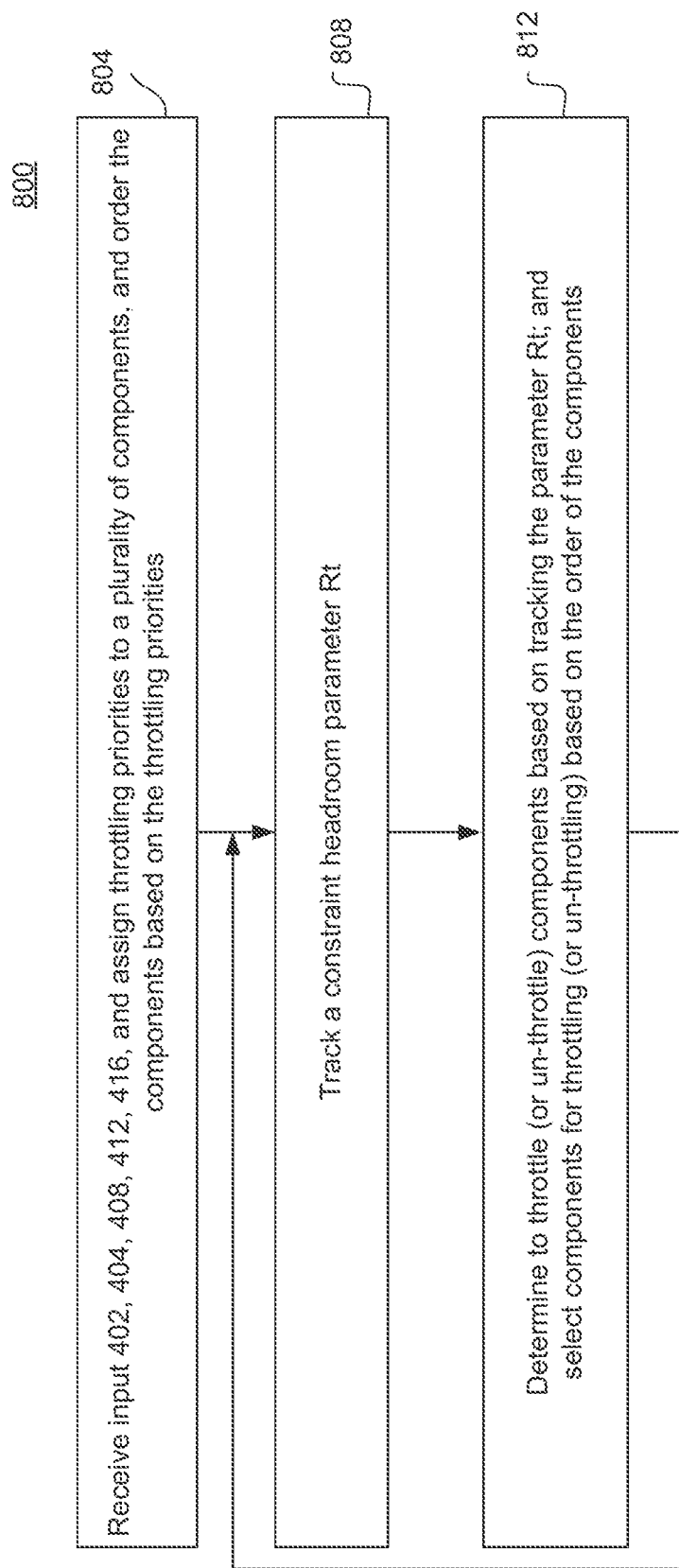
FIG. 8A illustrates a flowchart depicting a method for selecting an order or sequence to throttle various components of a computing device, based on an order of corresponding throttling priorities, according to some embodiments.

FIG. 8A illustrates a flowchart depicting a method 800 for selecting an order or sequence to throttle various components (e.g., components 104) of a computing device (e.g., device 100), based on an order of corresponding throttling priorities, according to some embodiments. Although the blocks in the flowchart with reference to FIG. 8A are shown in a particular order, the order of the actions can be modified. Thus, the illustrated embodiments can be performed in a different order, and some actions/blocks may be performed in parallel. Some of the blocks and/or operations listed in FIG. 8A may be optional in accordance with certain embodiments. The numbering of the blocks presented is for the sake of clarity and is not intended to prescribe an order of operations in which the various blocks must occur. Various operations of the method 800 may be performed by software components, hardware components, firmware components, logic blocks, etc.

At 804 of the method 800, the priority assignment logic 110 receives input 402, 404, 408, 412, and/or 416, and assigns throttling priorities (e.g., priorities Pa, ..., PN) to a plurality of components (e.g., components 104a, ..., 104N), e.g., as discussed with respect to FIGS. 3 and 4A. The components are ordered based on the throttling priorities, e.g., as discussed with respect to FIG. 6.

At 808 of the method 800, a constraint headroom parameter Rt is tracked, e.g., as discussed with respect to FIG. 6 and equations 1-3. The tracking of the parameter Rt may be performed at a continuous basis, at periodic intervals, at aperiodic intervals, or the like.

At 812 of the method 800, a determination is made to throttle (or un-throttle) components (e.g., by the throttling logic 114) based on tracking the parameter Rt, e.g., as discussed with respect to FIGS. 6-7. For examples, the parameter Rt is compared to various thresholds. If Rt becomes less than a threshold, a component is to be throttled. If Rt becomes higher than a threshold, a component is to be un-throttled.

Also at 812, one or more components are selected for throttling (or un-throttling), based on the order of the components discussed with respect to block 804. For example, as discussed herein above, components are throttled in descending order of priority, and are un-throttled in ascending order of priority (although in another example, components may be throttled in the ascending order of priority, and un-throttled in the descending order of priority).

The operations at blocks 808 and 812 are iteratively and continuously performed, e.g., as the method 800 loops back from 812 to 808. Although not illustrated in FIG. 8A, in an example, the throttling priorities may be re-assigned or updated (e.g., as discussed with respect to FIG. 4A), and in such situations, the method 800 may repeat the operations of block 804 as well.

Figure 8B:
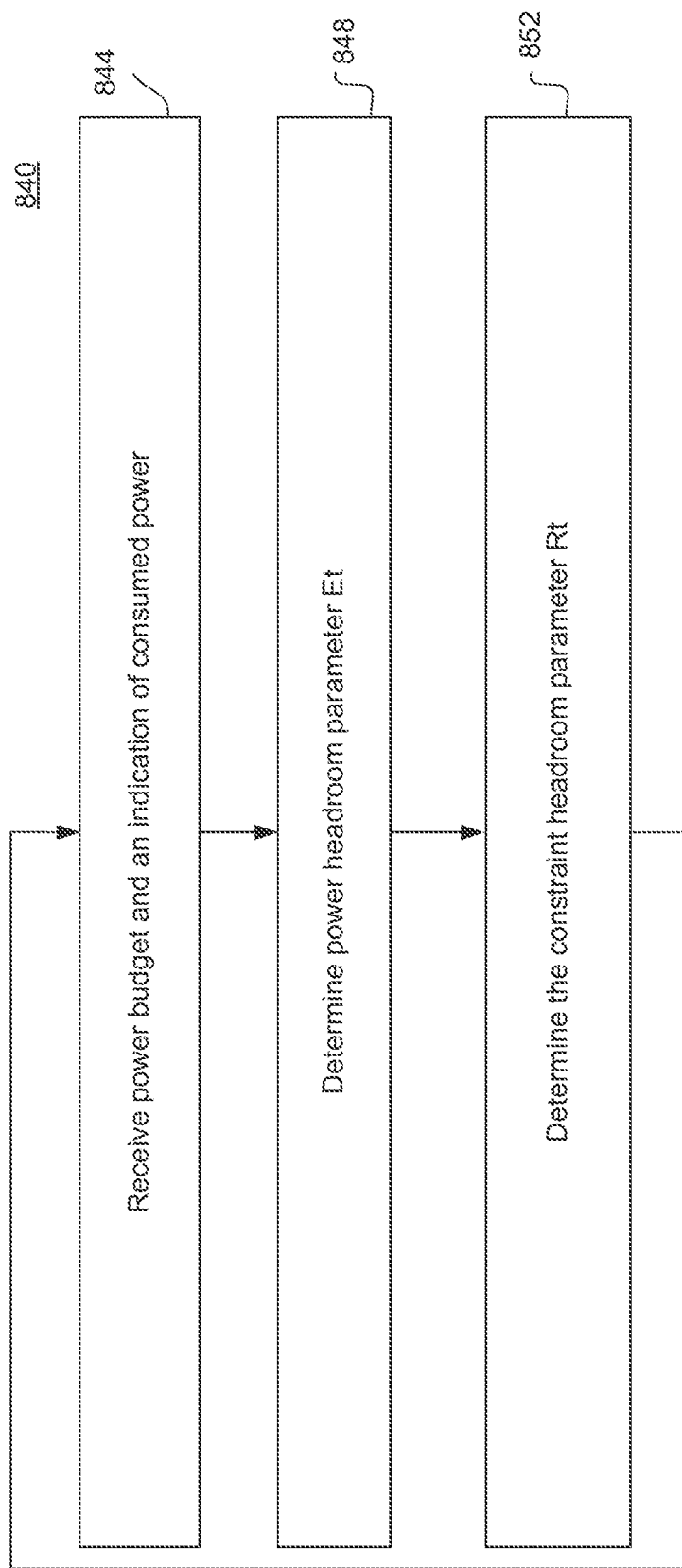
FIG. 8B illustrates a flowchart depicting a method for tracking a constraint headroom parameter, according to some embodiments.

FIG. 8B illustrates a flowchart depicting a method 840 for tracking a constraint headroom parameter Rt, according to some embodiments. Although the blocks in the flowchart with reference to FIG. 8B are shown in a particular order, the order of the actions can be modified. Thus, the illustrated embodiments can be performed in a different order, and some actions/blocks may be performed in parallel. Some of the blocks and/or operations listed in FIG. 8B may be optional in accordance with certain embodiments. The numbering of the blocks presented is for the sake of clarity and is not intended to prescribe an order of operations in which the various blocks must occur. Various operations of the method 840 may be performed by software components, hardware components, firmware components, logic blocks, etc.

In FIG. 8A, the block 808 is associated with tracking the constraint headroom parameter Rt. The method 840 of FIG. 8B provides example operations associated with tracking the constraint headroom parameter Rt.

Referring to the method 840 of FIG. 8B, at 844, a power budget and an indication of consumed power are received, e.g., by the PMU 455 (such as by the power management controller 505 of FIGS. 4B and 5). The power budget (e.g., the Power_Limit) and the indication of consumed power (e.g., the Consumed_power) are discussed in further details with respect to equation 1. In an example, the power budget and the indication of consumed power are for the SoC 450, for the system 440, for the device 100, or the like.

At 848, a power headroom parameter Et is determined, e.g., by the PMU 455 (such as by the power management controller 505 of FIGS. 4B and 5). Determination of the power headroom parameter Et is discussed in further details with respect to equation 1.

At 852, the constraint headroom parameter Rt is determined, e.g., by the PMU 455 (such as by the power management controller 505 of FIGS. 4B and 5). Determination of the constraint headroom parameter Rt is discussed in further details with respect to equations 2 and 3.

In some embodiments, the operations of blocks 844, 848, and 852 may be executed in a loop. Thus, the method loops back from 852 to 844. Hence, the constraint headroom parameter Rt is determined periodically, and the PMU 455, such as by the power management controller 505 of FIGS. 4B and 5, and transmits the constraint headroom parameter Rt to the throttling logic 114, e.g., as discussed with respect to FIG. 5.

Figure 8C:
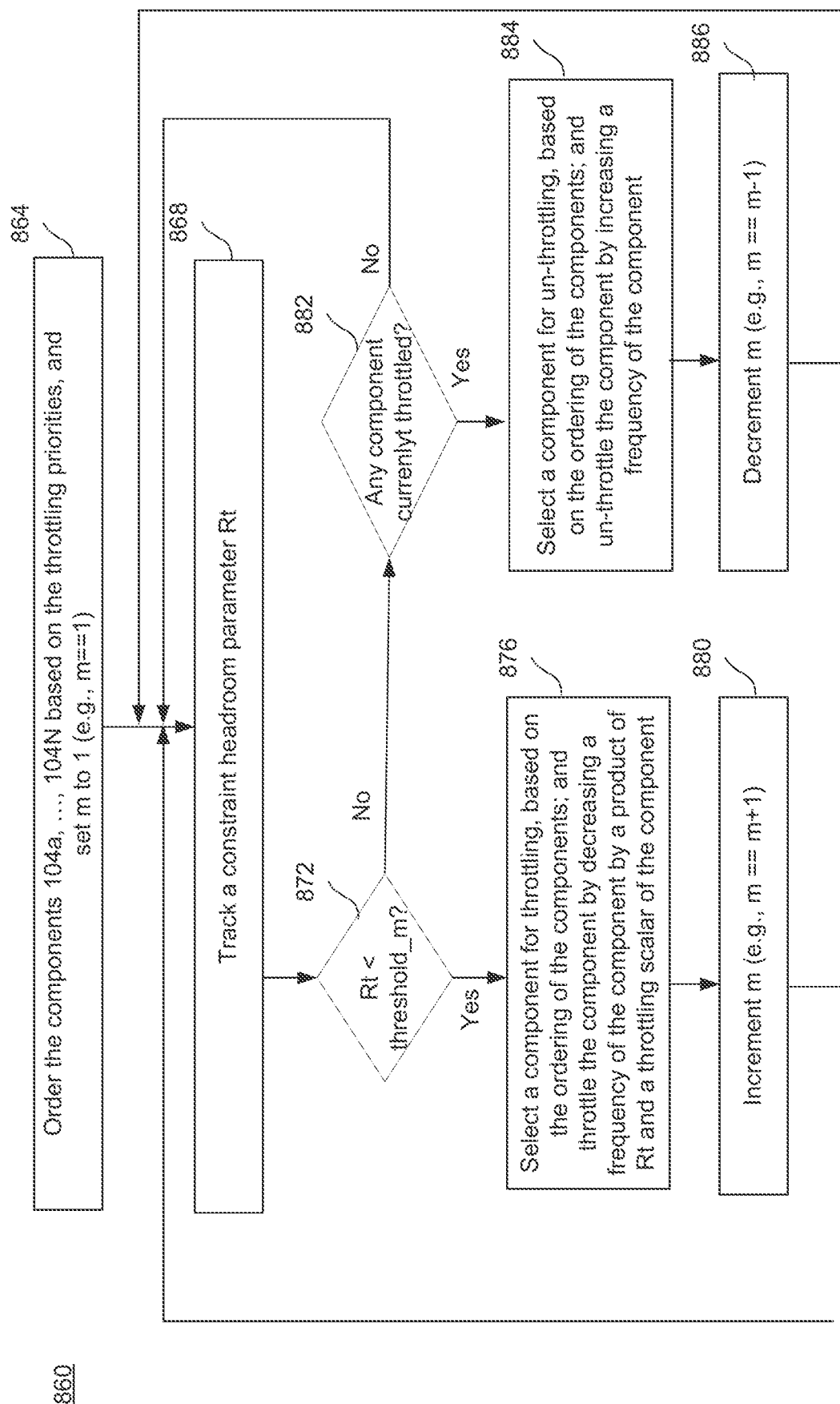
FIG. 8C illustrates a flowchart depicting a method for throttling and/or un-throttling one or more components, based on throttling priorities, according to some embodiments.

FIG. 8C illustrates a flowchart depicting a method 860 for throttling and/or un-throttling components 104, based on the throttling priorities, according to some embodiments. Although the blocks in the flowchart with reference to FIG. 8C are shown in a particular order, the order of the actions can be modified. Thus, the illustrated embodiments can be performed in a different order, and some actions/blocks may be performed in parallel. Some of the blocks and/or operations listed in FIG. 8C may be optional in accordance with certain embodiments. The numbering of the blocks presented is for the sake of clarity and is not intended to prescribe an order of operations in which the various blocks must occur. Various operations of the method 840 may be performed by software components, hardware components, firmware components, logic blocks, etc.

In FIG. 8A, the block 812 is associated with determining to throttle (or un-throttle) components based on tracking the parameter Rt, according to some embodiments. The method 880 of FIG. 8C discusses in details throttling (or un-throttling) of the components 104.

Referring to the method 860 of FIG. 8C, at 864, the components 104a, . . . , 104N are ordered based on the throttling priorities, e.g., as discussed with respect to block 804 of the method 800. Also, at 864, a counter m is set to 1 (e.g., m==1).

As discussed with respect to FIG. 6, the logic 114 has access to a plurality of thresholds, e.g., threshold_1, threshold_2, and so on. Merely as an example, a number of the thresholds is at least as large as (e.g., equal to) a number of components 104 having non-zero throttling priorities. Assume that there are M number of thresholds. It is assumed that the threshold_1, threshold_2, . . . , threshold_M are in a decreasing order (e.g., threshold_1>threshold_2> . . . >threshold_M). The counter m keeps track of the thresholds.

At 868, a constraint headroom parameter Rt is tracked, e.g., as discussed with respect to the method 840 of FIG. 8B.

At 872, it is determined whether the constraint headroom parameter Rt is less than the threshold_m. During the first iteration of the method 860, m is 1. Hence, at 872, it is determined whether the constraint headroom parameter Rt is less than the threshold_1. If so, then it implies that the power headroom is relatively low, and at least one component has to be throttled.

If "yes" at 872, the method 860 proceeds to 876, where a component 104 is selected for throttling, based on the ordering of the components. For example, the component 104 having the highest throttling priority is selected for throttling during the first iteration of the method 860.

Also at 876, the selected component is throttled, e.g., by decreasing a frequency of the component by a product of Rt and a throttling scalar of the component, e.g., as discussed with respect to FIG. 6 and section 720 of FIG. 7. At 880, the counter m is incremented, and the method 860 loops back to 868, where the constraint headroom parameter Rt is tracked.

Also, if "No" at 872 (e.g., the constraint headroom parameter Rt is more than the threshold_m), this implies that there is sufficient power headroom available. The method 860 then proceeds to 882, where it is checked if any component is currently throttled.

If no component is currently throttled (e.g., "No" is 882), the method 860 loops back to 868, where the constraint headroom parameter Rt is tracked. However, if "Yes" at 882, this implies that there is sufficient headroom available and one or more components are currently throttled, which can now be un-throttled.

The method 860 then (e.g., after "Yes" at 882) proceeds to 884, where a component is selected for un-throttling, based on the ordering of the components. For example, among the components that are currently throttled, the one with the highest throttling priority is selected for un-throttling. Also at 884, the selected component is un-throttled, e.g., by increasing a frequency of the component.

At 886, the counter m is decremented (e.g., m==m−1), and the method 860 loops back to 868, where the constraint headroom parameter Rt is tracked.

Thus, FIG. 8C illustrates selectively throttling and/or un-throttling the components 104, based on comparing the constraint headroom parameter Rt with various thresholds.

The order in which the components 104 are throttled and/or un-throttled is based on the throttling priorities associated with the components.

Figure 9:
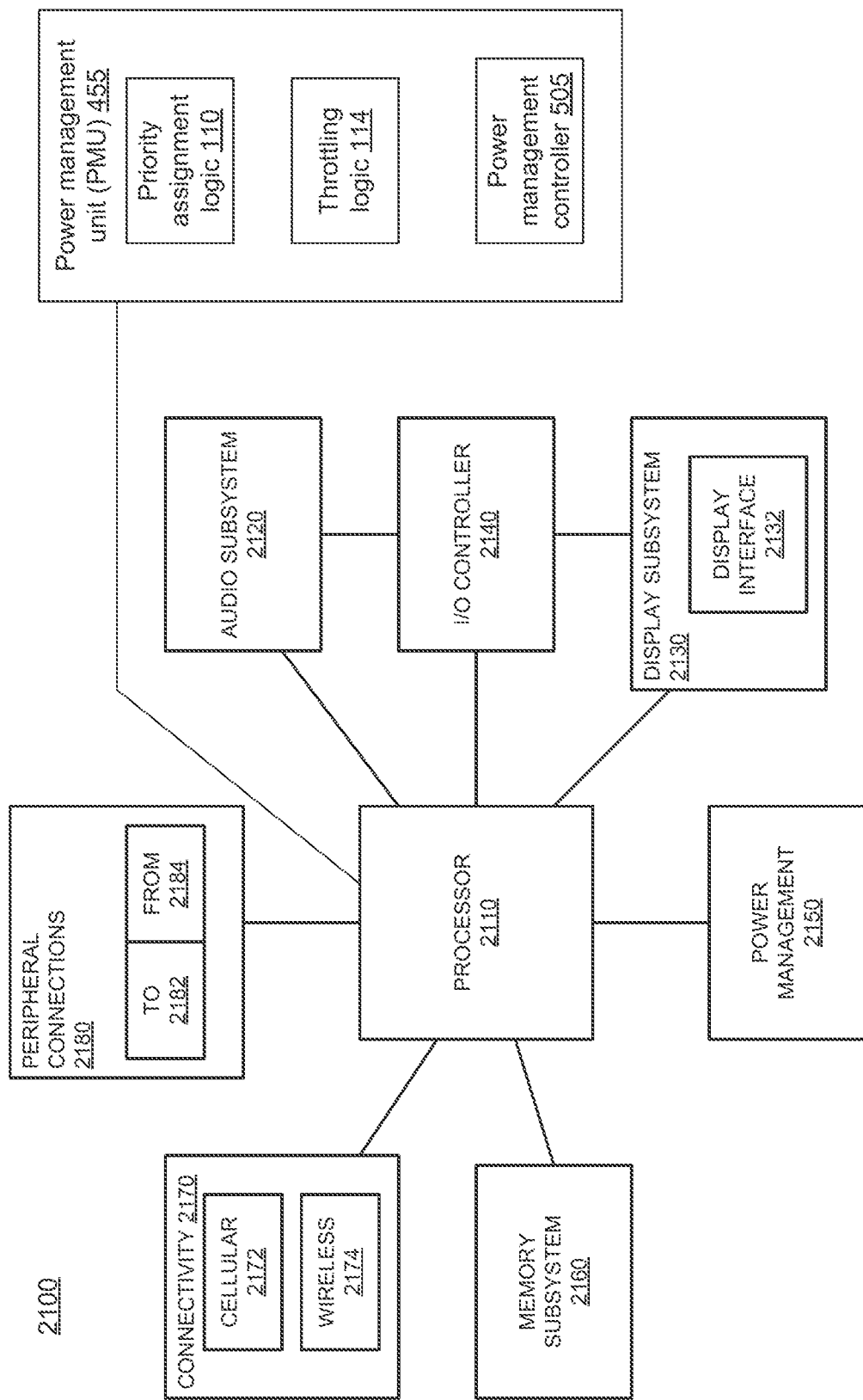
FIG. 9 illustrates a computer system, a computing device or a SoC (System-on-Chip), where an order or sequence to throttle various components of a computing device may be selected based on an order of corresponding throttling priorities, according to some embodiments.

FIG. 9 illustrates a computer system, a computing device or a SoC (System-on-Chip) 2100, where an order or sequence to throttle various components (e.g., components 104) of a computing device (e.g., device 100) may be selected based on an order of corresponding throttling priorities, according to some embodiments. It is pointed out that those elements of FIG. 9 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise the components 104a, ..., 104N of FIGS. 1-8. For example, individual ones of the components 104a, ..., 104N may include one or more processing cores of processor 2110, a memory of the memory subsystem 2160, a communication interface, or any appropriate component of the computing device 2100. The computing device 2100 may comprise the PMU 455 comprising the logic 110, 114, and the controller 505, as discussed with respect to FIGS. 1-8C.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following example clauses pertain to further embodiments. Specifics in the example clauses may be used anywhere in one or more embodiments. All optional features of the apparatus described herein may also be implemented with respect to a method or process.

Example 1. An apparatus comprising: a plurality of components, wherein an individual component has a corresponding throttling priority of a plurality of throttling priorities; and a logic to receive one or more parameters indicative of the plurality of throttling priorities, and to selectively throttle one or more of the plurality of components, wherein an order in which the one or more of the plurality of components are to be throttled is based on the plurality of throttling priorities.

Example 2. The apparatus of example 1 or any other example, wherein: a first component of the plurality of components has a first throttling priority; a second component of the plurality of components has a second throttling priority that is lower than the first throttling priority; and the logic is to throttle the first component prior to the second component, in response to the second throttling priority being lower than the first throttling priority.

Example 3. The apparatus of example 1 or any other example, wherein: the logic is to order the plurality of components in a first order, based on an order of the corresponding plurality of throttling priorities; and the one or more of the plurality of components are to be throttled in the first order.

Example 4. The apparatus of example 3 or any other example, wherein: the first order corresponds to a descending order of the plurality of throttling priorities.

Example 5. The apparatus of example 3 or any other example, wherein: the logic is to un-throttle the one or more of the plurality of components in a second order that is opposite of the first order.

Example 6. The apparatus of example 1 or any other example, wherein the logic is a first logic, and wherein the apparatus comprises: a second logic to respectively assign the plurality of throttling priorities to the corresponding plurality of components, based on input received from one or both of: an Operating System (OS), Basic Input/Output System (BIOS), or a User Interface.

Example 7. The apparatus of example 6 or any other example, wherein: the OS is to store the input to one or more registers; and the second logic is to receive the input from the one or more registers, and to respectively assign the plurality of throttling priorities to the corresponding plurality of components based on the input received from the OS via the one or more registers.

Example 8. The apparatus of example 1 or any other example, further comprising: a circuitry to update a headroom parameter that is representative of constraint headroom available to the plurality components, wherein the logic is to throttle a component, in response to the headroom parameter being lower than a threshold value.

Example 9. The apparatus of example 8 or any other example, wherein the constraint headroom is based on a power budget available to the plurality components and a sum of power consumed by the plurality components.

Example 10. The apparatus of example 8 or any other example, wherein: a first component of the plurality of components has a corresponding first throttling scaling coefficient; and in response to the first component being throttled, the first component is to reduce an operating frequency of the first component by a product of: the first throttling scaling coefficient and the headroom parameter.

Example 11. The apparatus of example 1 or any other example, wherein: a first component of the plurality of components comprises a first plurality of circuitries within a first voltage/frequency domain; and a second component of the plurality of components comprises a second plurality of circuitries within a second voltage/frequency domain.

Example 12. The apparatus of example 1 or any other example, further comprising: one or more registers to store the plurality of throttling priorities.

Example 13. A system comprising: a memory to store instructions; a processor coupled to the memory, the processor to execute the instructions; a wireless interface to facilitate communication between the processor and another system, wherein at least one of a plurality of components of the system has a corresponding throttling priority of a plurality of throttling priorities, and wherein the plurality of components includes one or more of: the memory, the processor, or the wireless interface; and a logic to throttle a first component of the plurality of components, based on the plurality of throttling priorities.

Example 14. The system of example 13 or any other example, wherein the logic is to: determine that the first component has a highest throttling priority among the throttling priorities of components that have not been throttled; and select the first component for throttling, based on the first component having the highest throttling priority.

Example 15. The system of example 13 or any other example, wherein the logic is to: receive a parameter that is indicative of a difference between: a budget available to the plurality components, and a sum of consumption by the plurality components, wherein the budget is one of: a power budget, a current budget, or a reliability budget.

Example 16. The system of example 15 or any other example, wherein the logic is to: throttle the first component, in response to the parameter being less than a threshold value.

Example 17. The system of example 15 or any other example, wherein the logic is to: receive a throttling scaling coefficient corresponding to the first component; and throttle the first component to reduce an operating frequency of the first component by a product of: the throttling scaling coefficient and the parameter.

Example 18. The system of example 15 or any other example, wherein the logic is to: throttle the first component to reduce an input voltage to the first component.

Example 19. Non-transitory computer-readable storage media to store instructions that, when executed by a processor, cause the processor to: receive a plurality of throttling priorities for a corresponding plurality of components; and determine a sequence in which the components are to be throttled, based on the plurality of throttling priorities.

Example 20. The non-transitory computer-readable storage media of example 19 or any other example, wherein: the sequence in which the components are to be throttled is based on a corresponding descending sequence of the plurality of throttling priorities.

Example 21. The non-transitory computer-readable storage media of example 19 or any other example, wherein: a first component of the plurality of components is assigned a first throttling priority; a second component of the plurality of components is assigned a second throttling priority that is lower than the first throttling priority; and the first component is throttled prior to the second component, in response to the second throttling priority being lower than the first throttling priority.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a plurality of components that include at least one compute unit and at least one non-compute unit;
   a first logic to assign, based on an input received from an operating system (OS) of the apparatus to assign throttling priorities, respective throttling priorities of a plurality of throttling priorities to respective ones of the plurality of components, wherein the OS of the apparatus is to store the input, wherein a compute unit of the at least one compute unit is assigned a first throttling priority of the plurality of throttling priorities, and a non-compute unit of the at least one non-compute unit is assigned a second throttling priority of the plurality of throttling priorities, and wherein the first throttling priority is different than the second throttling priority; and
   a second logic to:
   throttle, based on the first throttling priority, the compute unit; and
   throttle, based on the first and second throttling priorities, the non-compute unit subsequently to throttling the compute unit.

2. The apparatus of claim 1, wherein an order in which a component is to be throttled with respect to a second component of the plurality of components is based on a throttling priority of the component and a throttling priority of the second component.

3. The apparatus of claim 2, wherein the throttling priority of the second component is lower than the throttling priority of the component; and
   wherein the second logic is to throttle, based on the throttling priorities of the component and the second component, the component prior to throttling of the second component.

4. The apparatus of claim 1, wherein the input is provided to the first priority by a register of the OS.

5. The apparatus of claim 4, wherein the input is related to a 3-bit value of the register.

6. The apparatus of claim 4, wherein the register is to store respective indications of respective throttling priorities of the plurality of throttling priorities as respective 3-bit values.

7. The apparatus of claim 1, wherein the second logic is to throttle a component of a plurality of components through reduction of a frequency or voltage of the component.

8. The apparatus of claim 1, wherein the first throttling priority and the second throttling priority are further based on input received from one or more user interfaces (UIs).

9. The apparatus of claim 1, wherein the first throttling priority and the second throttling priority are further based on input received from one or more device drivers.

10. The apparatus of claim 1, wherein the apparatus comprises a power management processor that includes the first logic to assign the respective throttling priorities of the plurality of throttling priorities based on the input received from the OS of the apparatus.

11. One or more non-transitory computer-readable storage media comprising instructions that, upon execution of the instructions by one or more processors of an electronic device that includes a plurality of components, are to cause the electronic device to:
   identify a compute unit of one or more compute units of the plurality of components;
   identify a non-compute unit of one or more non-compute units of the plurality of components;
   assign, based on an input provided received from an operating system (OS) of the electronic device to assign throttling priorities, respective throttling priorities of a plurality of throttling priorities to respective ones of the plurality of components, wherein the OS of the electronic device is to store the input, wherein the compute unit is assigned a first throttling priority of the plurality of throttling priorities, and the non-compute unit is assigned a second throttling priority of the plurality of throttling priorities, and wherein the first throttling priority is different than the second throttling priority;
   throttle, based on the first throttling priority, the compute unit; and
   throttle, based on the first and second throttling priorities, the non-compute unit subsequently to throttling the compute unit.

12. The one or more non-transitory computer-readable media of claim 11, wherein an order in which a component is to be throttled with respect to a second component of the plurality of components is based on a throttling priority of the component and a throttling priority of the second component.

13. The one or more non-transitory computer-readable media of claim 12, wherein the throttling priority of the second component is lower than the throttling priority of the component; and
   wherein the instructions are further to throttle, based on the throttling priorities of the component and the second component, the component prior to throttling of the second component.

14. The one or more non-transitory computer-readable media of claim 11, wherein the instructions are further to provide the input to the first priority by a register of the OS.

15. The one or more non-transitory computer-readable media of claim 14, wherein the register is to store respective indications of respective throttling priorities of the plurality of throttling priorities as respective 3-bit values.

16. The one or more non-transitory computer-readable media of claim 11, wherein the instructions are further to throttle a component of a plurality of components through reduction of a frequency or voltage of the component.

17. An electronic device comprising:
a plurality of components that include a compute unit of one or more compute units and a non-compute unit of one or more non-compute units;
one or more processors; and
one or more non-transitory computer-readable storage media comprising instructions that, upon execution of the instructions by the one or more processors of an electronic device, are to cause the electronic device to:
assign, based on an input received from an operating system (OS) of the electronic device to assign throttling priorities, respective throttling priorities of a plurality of throttling priorities to respective ones of the plurality of components, wherein the OS of the electronic device is to store the input, wherein the compute unit is assigned a first throttling priority of the plurality of throttling priorities, and the non-compute unit is assigned a second throttling priority of the plurality of throttling priorities, and wherein the first throttling priority is different than the second throttling priority;
throttle, based on the first throttling priority, the compute unit; and
throttle, based on the first and second throttling priorities, the non-compute unit subsequently to throttling the compute unit.

18. The electronic device of claim 17, wherein an order in which a component is to be throttled with respect to a second component of the plurality of components is based on a throttling priority of the component and a throttling priority of the second component.

19. The electronic device of claim 17, wherein the instructions are further to provide the input to the first priority by a register of the OS.

20. The electronic device of claim 17, wherein the instructions are further to throttle a component of a plurality of components through reduction of a frequency or voltage of the component.

21. The electronic device of claim 17, wherein the component is a memory, processor, or wireless interface of the electronic device.

* * * * *